US007555304B2

United States Patent
Schwagmann et al.

(10) Patent No.: US 7,555,304 B2
(45) Date of Patent: Jun. 30, 2009

(54) METHOD AND COMMUNICATIONS ARRANGEMENT FOR SETTING UP A PUSH-TO-TALK COMMUNICATIONS LINK AND PUSH-TO-TALK CLIENT UNIT

(75) Inventors: Norbert Schwagmann, Lehe (DE); Josef Laumen, München (DE); Andreas Schmidt, Braunschweig (DE)

(73) Assignee: Infineon Technologies AG, Munich (DE)

( * ) Notice: Subject to any disclaimer, the term of this patent is extended or adjusted under 35 U.S.C. 154(b) by 607 days.

(21) Appl. No.: 11/070,380

(22) Filed: Mar. 2, 2005

(65) Prior Publication Data

US 2005/0261015 A1 Nov. 24, 2005

(30) Foreign Application Priority Data

Mar. 5, 2004 (DE) ........................ 10 2004 010 925

(51) Int. Cl.
*H04B 7/00* (2006.01)
(52) U.S. Cl. ...................... 455/518; 455/418; 455/552.1
(58) Field of Classification Search .................. 455/39, 455/500, 507, 517, 518, 519, 73, 90.2, 418, 455/552.1
See application file for complete search history.

(56) References Cited

U.S. PATENT DOCUMENTS

| 5,542,108 | A |   | 7/1996  | Sasuta           |         |
|-----------|---|---|---------|------------------|---------|
| 5,737,685 | A | * | 4/1998  | Locascio et al.  | 455/12.1|
| 6,119,017 | A | * | 9/2000  | Cassidy et al.   | 455/518 |
| 6,178,323 | B1| * | 1/2001  | Nagata           | 455/416 |
| 6,381,467 | B1| * | 4/2002  | Hill et al.      | 455/519 |
| 6,490,452 | B1| * | 12/2002 | Boscovic et al.  | 455/436 |
| 6,526,377 | B1| * | 2/2003  | Bubb             | 704/211 |
| 6,865,398 | B2| * | 3/2005  | Mangal et al.    | 455/552.1|
| 7,170,863 | B1| * | 1/2007  | Denman et al.    | 370/260 |
| 2002/0039895 | A1 |   | 4/2002 | Ross et al.      |         |
| 2004/0121791 | A1 | * | 6/2004 | May et al.       | 455/519 |
| 2004/0162095 | A1 | * | 8/2004 | Edwards et al.   | 455/518 |
| 2004/0219925 | A1 | * | 11/2004| Ahya et al.      | 455/450 |

FOREIGN PATENT DOCUMENTS

| WO | WO 2004/075581 A1 | 9/2004  |
|----|-------------------|---------|
| WO | WO 2004/098094 A1 | 11/2005 |
| WO | WO 2004/100419 A2 | 11/2005 |

OTHER PUBLICATIONS

Office Action in the Mexican Patent Office including an uncertified translation.
J. Rosenberg, H. Schulzrinne, G. Camarillo, A. Johnston, J. Peterson, R. Sparks, M. Handley and E. Schooler, *SIP: Session Initiation Protocol*, pp. 1-269. The Internet Society, Jun. 2002.
*Push-to-Talk Over Cellular (PoC) Architecture PoC Release 1.0*, pp. 1-23, Architecture V1.1.0. Aug. 2003.

\* cited by examiner

*Primary Examiner*—Lincoln Donovan
*Assistant Examiner*—David S Luo
(74) *Attorney, Agent, or Firm*—Brinks Hofer Gilson & Lione (57) ABSTRACT

Within the scope of a setup of a push-to-talk communications link, a link setup message is transmitted from a first push-to-talk client unit to a push-to-talk server unit. The link setup message contains a mode information item which specifies whether the client unit desires a setup of the communications link in the unconfirmed indication mode or in the confirmed indication mode.

27 Claims, 8 Drawing Sheets

FIG 1

METHOD AND COMMUNICATIONS ARRANGEMENT FOR SETTING UP A PUSH-TO-TALK COMMUNICATIONS LINK AND PUSH-TO-TALK CLIENT UNIT

PRIORITY CLAIM

This application claims the benefit of priority to German Application No. 10 2004 010 925.7-42, filed on Mar. 5, 2004.

TECHNICAL FIELD

The invention relates to a method and a communications arrangement for setting up a push-to-talk communications link and a push-to-talk client unit.

BACKGROUND

Push-to-talk over cellular (PoC), also referred to as "direct connect" is a service which permits a user or transmitter to transfer a voice message to one or more receivers simultaneously via a mobile telephone interface. Within the scope of a PoC communication, the voice data is usually already distributed over the mobile telephone communications network, i.e. transferred to the desired receiver or receivers, as the voice signal to be transmitted is spoken into the mobile telephone terminal by the user. A PoC communication corresponds to the CB radio but is extended in such a way that the transmitter can speak to receivers throughout the world, which can be reached via the suitable switching technology of at least one mobile telephone communications network.

The following publications are cited in this document:

[1] Push to talk-over-Cellular (PoC); Architecture V1.1.0, Technical specification (2003-08);

[2] RFC 3261, SIP: Session Initiation Protocol, 2002.

[1] describes an industrial specification of a consortium of companies, in which, inter alia, Nokia, Ericsson, Motorola and Siemens are involved, based on the PS domain (i.e. packet-switched domain).

[1] describes two different variants for setting up a push-to-talk communications link (i.e. a PoC session) which differ in terms of the time at which a first PoC user can begin to talk to a PoC server unit after the push-to-talk communications link has been set up, i.e. after a PoC session has been set up, and the voice signals which are spoken into the device are transmitted to the at least one second, selected PoC user.

According to a first variant described in [1], which is referred to as a Late Media Mode (also referred to as Confirmed Indication Mode), an enable signal is not transmitted to the first PoC user, i.e. a first PoC client unit, in order to transmit useful data, preferably useful voice data, until a push-to-talk communications link has actually been set up to the selected at least one second PoC user, i.e. to the at least one second PoC client unit to which a PoC communications link is to be set up, and the at least one second PoC user has also accepted the PoC call.

In this case, only then is the respective voice message transferred from the first push-to-talk client unit to the second push-to-talk client unit.

Figure 2:
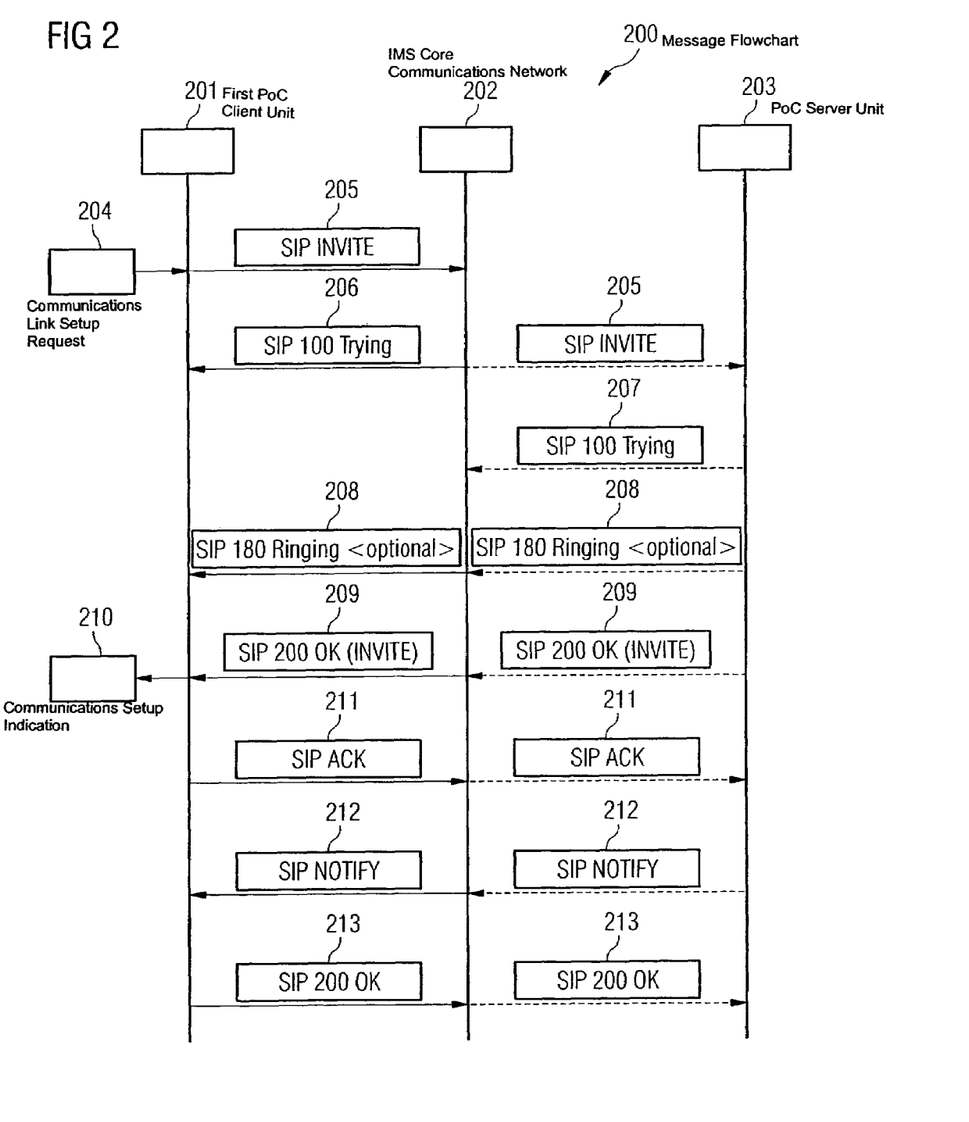
FIG. 2 is a message flowchart in which the setup of a PoC communications link according to [1] is illustrated for the case in which the PoC server unit is operated in the confirmed indication mode.

FIG. 2 shows, in a message flow chart 200, the exchange of SIP messages (Session Initiation Protocol) which, in order to set up a PoC communications link in the confirmed indication mode, are exchanged between a first PoC client unit 201—implemented in a mobile telephone terminal—an IMS core communications network 202 (Internet Protocol Multimedia Subsystem) and a PoC server unit 203. According to the message flowchart 200 it is assumed that the PoC server unit 203 is operated in the late media mode.

If a request to set up a push-to-talk communications link to at least a second PoC client unit is entered into at least one second PoC client unit by means of a communications link setup request 204 by a user of the mobile telephone terminal in which the first PoC client unit 201 is implemented, a first SIP-INVITE message 205 according to the Session Initiation Protocol (SIP) such as is described, for example, in [2] is transferred to the IP Multimedia Subsystem (IMS) core communications network 202 from the first PoC client unit 201. If the IMS core communications network 202 receives the SIP-INVITE message 205, the IMS core communications network 202 of the first PoC client unit 201 confirms the attempt at setting up a communications link by means of a SIP-100 trying message 206. In addition, the IMS core communications network 202 passes on the SIP-INVITE message 205 to the PoC server unit 203. The PoC server unit 203 also acknowledges the reception of the SIP-INVITE message 205 with a SIP-100 trying message 207 which it transfers to the IMS core communications network 202.

Optionally, within the scope of the setup of the communications link it is possible to transfer a call signal message, encoded as a SIP-180 ringing message 208, from the PoC server unit 203 to the IMS core communications network 202 and from there to the first PoC client unit 201.

If a communications link has been successfully set up from the PoC server unit 203 to the at least one selected, i.e. desired, second PoC client unit (not shown in FIG. 2), the PoC server unit 203 transfers an enable message in the form of a SIP-200-OK (INVITE) message 209 to the IMS core communications network 202 and by means of the latter to the first PoC client unit 201 which itself outputs a communications setup indication 210 to the user of the mobile telephone terminal. The first PoC client unit 201 can then begin to transmit useful data, in particular to transmit voice data spoken into the PoC server unit 203 by the user, and via the latter to the at least one second PoC client unit.

In addition, an acknowledgement message in the form of a SIP-ACK message 211 is transmitted to the IMS core communications network 202 and via the latter to the PoC server unit 203 from the first PoC client unit 201.

Then, after the push-to-talk server unit 203 has received the acknowledgement message 211, the latter transmits a subscriber notification message as a SIP-NOTIFY message 212 to the IMS core communications network 202 which passes the SIP-NOTIFY message 212 on to the first PoC client unit 201. After the reception of the SIP-NOTIFY message 212 by the first PoC client unit 201, a communication setup confirmation message 213 in the form of a SIP-200-OK message 213 is transferred to the IMS core communications network 202, and from the latter to the PoC server unit 203, by which means the communications link is set up, as a termination of the setup of a push-to-talk communications link between the first PoC client unit 201 and the at least one selected second PoC client unit.

According to the second variant, which is referred to as an early media mode (also referred to as unconfirmed indication mode), an enable signal for the transmission of useful data, in particular for the transmission of spoken-in voice signals, is already fed to the first PoC client unit 201 if the PoC communications link is present between the first PoC client unit 201 and the PoC server unit 203 although a complete PoC communications link has not yet been set up to the selected second PoC client unit or units.

In other words, according to the second variant the user of the first PoC client unit 201 can already start to talk and the voice data is already transmitted even though the "selected" client, i.e. the "selected" second PoC client unit or units have not yet been reached by the PoC server unit 203.

All that is required according to this mode is that the selected second PoC client unit or units are signed on in the mobile telephone communications network or to the PoC service, in other words are on line, and the respective user of the selected second PoC client unit has set what is referred to as the "automatic answering mode", when a PoC communications link setup message is received by means of the PoC server unit 203. The term "automatic answering mode" refers to a mode in which the received voice message is output without interaction with the receiver of a PoC voice message at his respective terminal, and he therefore does not need to explicitly "accept" an incoming call. In this mode, the voice messages are buffered in the PoC server unit and only transferred to the respectively selected second PoC client unit as soon as said unit has been reached.

Figure 3:
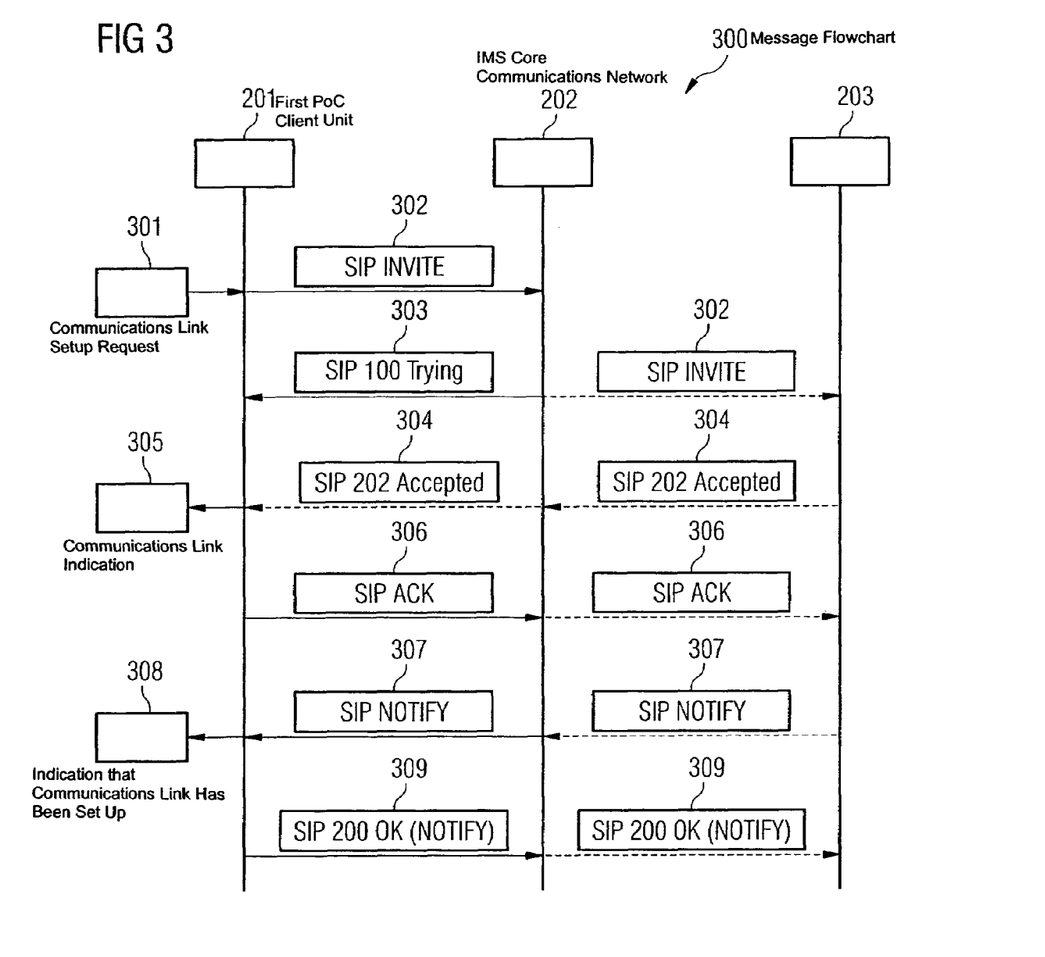
FIG. 3 is a message flowchart in which the setup of a PoC communications link according to [1] is illustrated for the case in which the PoC server unit is operated in the unconfirmed indication mode.

FIG. 3 is a message flowchart 300 showing the flow of messages between the first PoC client unit 201, the IMS core communications network 202 and the PoC server unit 203 for a situation in which the PoC server unit 203 is operated in the early media mode, i.e. in the unconfirmed indication mode.

In response to the inputting of a communications link setup request 301 by a user into the mobile telephone terminal in which the first PoC client unit 201 is implemented, the first PoC client unit 201 transfers a first SIP-INVITE message 202 to the IMS core communications network 202 in accordance with the SIP.

If the IMS core communications unit 202 receives the SIP-INVITE message 302, the IMS core communications network 202 transfers a first confirmation message 303 as a SIP-100 trying message 303 to the first PoC client unit 201 in response to the reception. In addition, the IMS core communications unit 202 passes on the SIP-INVITE message 302 to the PoC server unit 203 which itself transfers a communications link accepted message 304 as a SIP-202 accepted message 304 to the IMS core communications network 202. The IMS core communications network 202 passes on this message to the first PoC client unit 201. After the first PoC client unit 201 has received the SIP-202 accepted message 304, it outputs a communications link indication 305 to the user of the first PoC client unit 201. In addition, the first PoC client unit 201 transfers a confirmation message 306 as a SIP-ACK message 306 to the IMS core communications network 202 which passes this on to the PoC server unit 203.

Once the first PoC client unit 201 has received the SIP-202 accepted message 304, the voice signals which have been spoken in by the user are transmitted from the first PoC client unit 201 to the IMS core communications network 202 and via it to the PoC server unit and buffered there.

If a communications link is set up to the at least one second, i.e. selected PoC client unit (not shown in FIG. 3), the PoC server unit 203 transmits a subscriber confirmation message 307 in the form of a SIP-NOTIFY message 307 to the IMS core communications network 202 which, for its part, transfers it to the first PoC client unit 201.

After reception of the SIP-NOTIFY message 307, the first PoC client unit 201 outputs an indication 308 that the communications link has been set up to the user, which indication specifies that a communications link has actually been set up to the selected second PoC client unit or units.

The first PoC client unit 201 then transfers a communications link setup confirmation message 309 as a SIP-200-OK (NOTIFY) message 309 to the IMS core communications network 202 which, for its part, passes on the message to the PoC server unit 203.

According to the current standardization efforts there is provision for the PoC server unit to have to support the confirmed indication mode but only to have to support the unconfirmed indication mode on an optional basis. If a PoC server unit supports both the confirmed indication mode and the unconfirmed indication mode, it can select, at each setup of a PoC communications link, i.e. at each setup of a PoC session, which of the two modes is offered to the respective PoC user. In addition, the PoC user who sets up a PoC session, i.e. initiates it, is also to be able to select whether he would like to use the unconfirmed indication mode (if the PoC server unit supports this) or in any case would like to use the confirmed indication mode.

According to [1], in the case in which the PoC server unit is operated in the confirmed indication mode, it is irrelevant which mode the user of the respective PoC client unit would like to use.

The confirmed indication mode is always used by the PoC server unit, and thus for the entire PoC communications link, i.e. as soon as the communications link has been set up to the at least one "selected" second PoC client unit and the latter has accepted the incoming call, the PoC server unit 203 transmits the SIP-200-OK (INVITE) message 209 which is described above to the first PoC client unit 201.

After the SIP-200-OK message 209 has been received, the user of the first PoC client unit 201 can start to speak and the speech signals which are spoken in are transmitted from this time to the IMS core communications network 202 and passed on from there directly to the selected second PoC client unit or units.

If, as illustrated in FIG. 3, the PoC server unit 203 is operated in the unconfirmed indication mode, the communications link between the first PoC client unit 201 and the PoC server unit 203 is set up when the transfer takes place, i.e. when the SIP-202 accepted message 304 is received in the first PoC client unit 201.

In this case, two situations can be distinguished from one another.

If the user of the first PoC client unit 201 would like to use the unconfirmed indication mode, he can start to speak after reception of the SIP-202 accepted message 304, and the spoken-in voice signals are transmitted from the first PoC client unit 201 to the IMS core communications unit 202 and from there to the PoC server unit 203. As a result the unconfirmed indication mode is used.

However, if the user of the first PoC client unit 201 would like to use the confirmed indication mode, he does not consider the reception of the SIP-202 accepted message 304 as a confirmation that he can start to transfer voice data but rather he waits until the first PoC client unit 201 informs him, with the reception of the SIP-NOTIFY message 307 by means of the communication setup confirmation indication 308, that the communications link has been set up to the "selected" second PoC client unit or units and the user of the respective second PoC client unit has accepted the PoC call. The user of the first PoC client unit 201 can then start to speak and the spoken-in voice signals are transmitted to the IMS core communications network 202 and from there by means of the PoC server unit 203 to the selected second PoC client unit or units. As a result, in this case the confirmed indication mode is used.

Generally, according to [1] it is generally provided that, with the first SIP-INVITE message 205 or 302 which is transmitted by the first PoC client unit 201, a SIP-SUBSCRIBE is implicitly actuated, on the basis of which the PoC server unit transmits a SIP-NOTIFY message to the first PoC client unit 201 each time as soon as a selected second PoC client unit has accepted the call.

However, within the scope of the standardization efforts of the PoC communications the OMA (Open Mobile Alliance) as defined that implicit activation of a SIP-SUBSCRIBE for the first PoC client units is not carried out with the SIP-INVITE message. Instead, according to the proposals of the OMA standardization the first PoC client unit can optionally transmit a SUBSCRIBE message in order to be informed of how "selected" second PoC client units have replied, that is to say whether they have rejected the call or accepted it, whether they cannot be reached or whether they are busy, etc.

Figure 4:
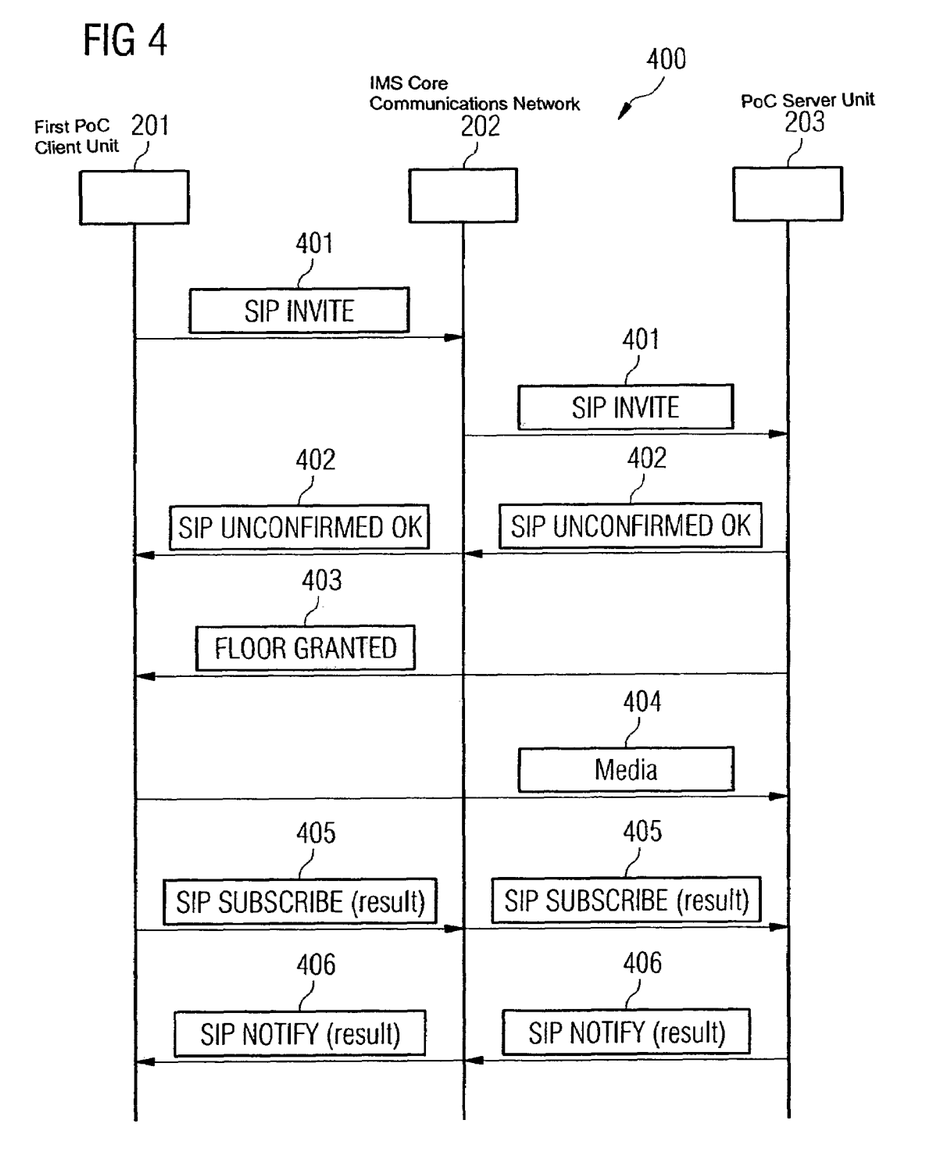
FIG. 4 is a message flowchart according to the current OMA specification for the case in which the PoC server unit is operated in the unconfirmed indication mode.

FIG. 4 shows, in a further message flowchart 400, a setup, provided at the present within the scope of the OMA standardization, of a PoC communications link for the case in which the PoC server unit 203 is operated in the unconfirmed indication mode.

According to this proposal, in response to the transfer of a communications link setup request message 401 in the form of a SIP-INVITE message 401 from the first PoC client unit 201 to the PoC server unit 203 via the IMS core communications network 202 an unconfirmed enable message in the form of a SIP-UNCONFIRMED-OK message 402 is transferred from the PoC server unit 203 via the IMS core communications unit 202 to the first PoC client unit 201, and a SIP floor granted message 403 is then transmitted from the PoC server unit 203 to the first PoC client unit 201, and the channel for transmitting useful data, in particular voice data, from the first PoC client unit 201 to the PoC server unit 203 is thus enabled.

Useful data message 404 are then transmitted from the first PoC client unit 201 to the PoC server unit 203.

As shown in the message flowchart 400, it is not provided for the selection as to whether the confirmed indication mode or the unconfirmed indication mode is to be used to be left to the first PoC client unit 201.

If the PoC service unit 203 is operated in the unconfirmed indication mode, the user of the first PoC client unit 201 must always accept the unconfirmed indication mode although this may constitute a bad user experience from the point of view of the user of the first PoC client unit 201, i.e. may lead to inconvenience for the user. This is the case, for example, if the user of the first PoC client unit 201 starts to speak and transmits useful data messages 404 and does not learn until a later time that there was no possibility at all of setting up a push-to-talk communications link to a second, i.e. selected PoC client unit since, for example, all selected PoC client units either could not be reached, were busy or rejected the call.

It is thus desirable that the user of the first PoC client unit 201 should always have the choice between the two available indication modes.

According to the current proposal within the scope of OMA standardization a SUBSCRIBE the (result) message 405 is provided as an optional message which is transmitted from the first PoC client unit 201 via the IMS core communications network 202 to the PoC server unit 203, after which the PoC server unit 203 can, if appropriate, transmit a subscriber confirmation message, in the form of a SIP-NOTIFY (result) message 406, to the first PoC client unit 201 in order to indicate that the selected second PoC client unit or units have accepted or rejected the requests to set up a communications link.

Since the SUBSCRIBE message 405 and the SIP-NOTIFY (result) message 406 are provided as optional messages, this means that a user of the first PoC client unit 201 does not need to use this feature, specifically that he is informed as soon as a "selected" second PoC client unit has responded.

If a user of the first PoC client unit 201 does not use this feature, this means, however, that no SIP-NOTIFY (result) messages 406 are transferred to him, as a result of which it is no longer possible for the user of the first PoC client unit 201 to choose between the two indication modes. This results from the fact, as described above, that a SIP-NOTIFY message is necessary if the PoC server unit 203 uses the unconfirmed indication mode but the user of the first PoC client unit 201 would like to use the confirmed indication mode.

BRIEF SUMMARY

The invention is based on the problem of permitting a user of a terminal within the scope of the setup of a push-to-talk communications link, i.e. a user of a push-to-talk client unit, to choose easily between different modes within the scope of the setup of a push-to-talk communications link.

In one embodiment, a method for setting up a push-to-talk communications link, preferably a push-to-talk over cellular communications link, between a first push-to-talk client unit and at least one second push-to-talk client unit, in a push-to-talk connection setup message is transmitted from the first push-to-talk client unit to a push-to-talk server unit. The push-to-talk connection setup message contains a mode information item with which a communications link mode which is to be used for the requested push-to-talk communications link is specified. Depending on the push-to-talk communications link mode to be used, the first push-to-talk client unit has transmitted to its an enable signal for the transmission of useful data from the push-to-talk server unit at different times within the scope of the setup of a push-to-talk communications link and can thus start to speak speech signals into the first push-to-talk client unit at different times. In other words, the useful data is transmitted from the first push-to-talk client unit to the push-to-talk server unit at different times as a function of the selected push-to-talk communications link mode.

A push-to-talk client unit has a unit for forming a push-to-talk link setup message, wherein the push-to-talk link setup message contains a mode information item with which a push-to-talk communications link mode which is to be used for the requested push-to-talk communications link is specified, wherein the first push-to-talk client unit receives an enable signal for transmitting useful data as a function of the communications link mode from the push-to-talk server unit at different times within the scope of the setup of a push-to-talk communications link. In addition, the push-to-talk client unit has a transmitter unit for transmitting the push-to-talk link setup message to a push-to-talk server unit.

In another embodiment, a communications arrangement for setting up a push-to-talk communications link between a first push-to-talk client unit and at least one second push-to-talk client unit has a first push-to-talk client unit which is configured in the same way as the push-to-talk client unit described above. In addition, the communications arrangement has a push-to-talk server unit which contains a receiver unit for receiving the push-to-talk link setup message and a unit for setting up a push-to-talk communications link to the at least one second push-to-talk client unit according to the mode information in the push-to-talk link setup message. In addition, at least one second push-to-talk client unit is provided with a receiver unit for receiving the push-to-talk link setup message and with a transmitter unit for transmitting push-to-talk messages to the push-to-talk server unit.

In one embodiment, the first push-to-talk client unit explicitly informs the push-to-talk server unit, in the push-to-talk link setup message, whether the first push-to-talk client unit, and thus the user of the first push-to-talk client unit, would like to use the confirmed indication mode or the unconfirmed indication modely.

As a result, the user of the first push-to-talk client unit can determine himself whether he would like to use the unconfirmed indication mode or the confirmed indication mode within the scope of the setup of a push-to-talk communications link. Since the unconfirmed indication mode can have a number of disadvantages in the user experience of the user of a push-to-talk client unit, it has a considerable significance that the user can make this selection explicitly.

A further advantage of the invention is its simplicity.

It is not necessary to provide additional messages between the first push-to-talk client unit and the push-to-talk server unit within the scope of the setup of the push-to-talk communications link, as is necessary, for example, according to the proposal of the OMA standardization group with the optional SUBSCRIBE message but rather, according to one embodiment of the invention, only one new parameter, specifically the mode information, is introduced into a message, specifically the push-to-talk link setup message, while the push-to-talk link setup message must in any case be transmitted from the first push-to-talk client unit to the push-to-talk server unit.

A further advantage of the invention is that no misunderstandings can occur if, for example, a NOTIFY message has been transmitted from the push-to-talk server unit but is not received by the first push-to-talk client unit.

According to one embodiment of the invention, the push-to-talk units are embodied as push-to-talk over cellular units, i.e. in other words as units which are integrated into mobile telephone terminals and which exchange messages with one another via a mobile telephone interface. As a result, according to one embodiment, a mobile telephone communications link is set up as the push-to-talk communications link.

When the session initiation protocol is used the mode information is preferably transmitted from the first push-to-talk client unit to the push-to-talk server unit using a parameter which is to be newly provided, wherein it is specified whether the push-to-talk client unit selects the unconfirmed indication mode or the confirmed indication mode within the scope of the setup of the push-to-talk communications link.

Voice data which is spoken by the user into the communications terminal, preferably into a mobile telephone communications terminal in which the first push-to-talk line unit is implemented, is preferably used as useful data. Alternatively or additionally image data (still image data and/or video image data) and/or textual data can be used as the useful data.

The mode information preferably specifies whether an unconfirmed indication mode or a confirmed indication mode is to be used within the scope of the setup of the push-to-talk communications link.

According to one embodiment of the invention there is provision that, in order to set up the push-to-talk communications link, a signaling communications protocol is used which is implemented in at least one of the following layers according to the OSI reference model: session layer, presentation layer and/or application layer.

The Session Initiation Protocol (SIP) is preferably used as the signaling communications protocol in the abovementioned layers to set up the push-to-talk communications link.

In this case, a session initiation protocol INVITE message is formed as a push-to-talk link setup message as one embodiment of the invention, and is transmitted from the first push-to-talk client unit to the push-to-talk server unit.

According to this embodiment of the invention, in particular the very simple possibility of the user of the first push-to-talk client unit selecting a desired indication mode from a plurality of different indication modes is very advantageous.

In the transport layer, the transmission of the push-to-talk communications setup message and of the further SIP messages, generally the protocol data units formed in the session layer, the presentation layer and/or the application layer, is carried out by means of the Transport Control Protocol (TCP) or by means of the User Datagram Protocol (UDP).

In particular the use of the UDP provides the advantage of very rapid transmission of data and thus of the very rapid setup of a push-to-talk communications link.

According to one embodiment of the invention, the transmission of the transport control protocol—protocol data unit or of the user datagram protocol— protocol data unit is carried out in accordance with the Internet Protocol (IP).

In other words, according to one embodiment of the invention it is provided that the transmission of the data is carried out by means of the IP multimedia subsystem based on the TCP/UDP and IP protocol stack.

This refinement of the invention permits the invention to be implemented in a simple way which can be used universally on the Internet.

The embodiments of the invention which are described above relate to the method and to the communications arrangement for setting up a push-to-talk communications link and to the push-to-talk client unit.

According to another embodiment of the invention it is provided that the push-to-talk server unit, preferably the push-to-talk over cellular server unit, is configured in such a way that it inserts the desired mode information into the SIP-INVITE message which the transmits to the second PoC client units, and thus transfers to the second PoC client units the information which specifies which indication mode has been selected by the user of the first PoC client unit.

According to another embodiment according to the invention, this information can be transferred from the push-to-talk over cellular server unit to the second PoC client units in a separate electronic message.

Exemplary embodiments of the invention are illustrated in the figures and explained in more detail in the text which follows. It is to be noted that identical reference symbols are used for identical or similar elements within the scope of the exemplary embodiments.

DETAILED DESCRIPTION OF THE EMBODIMENTS

Figure 1:
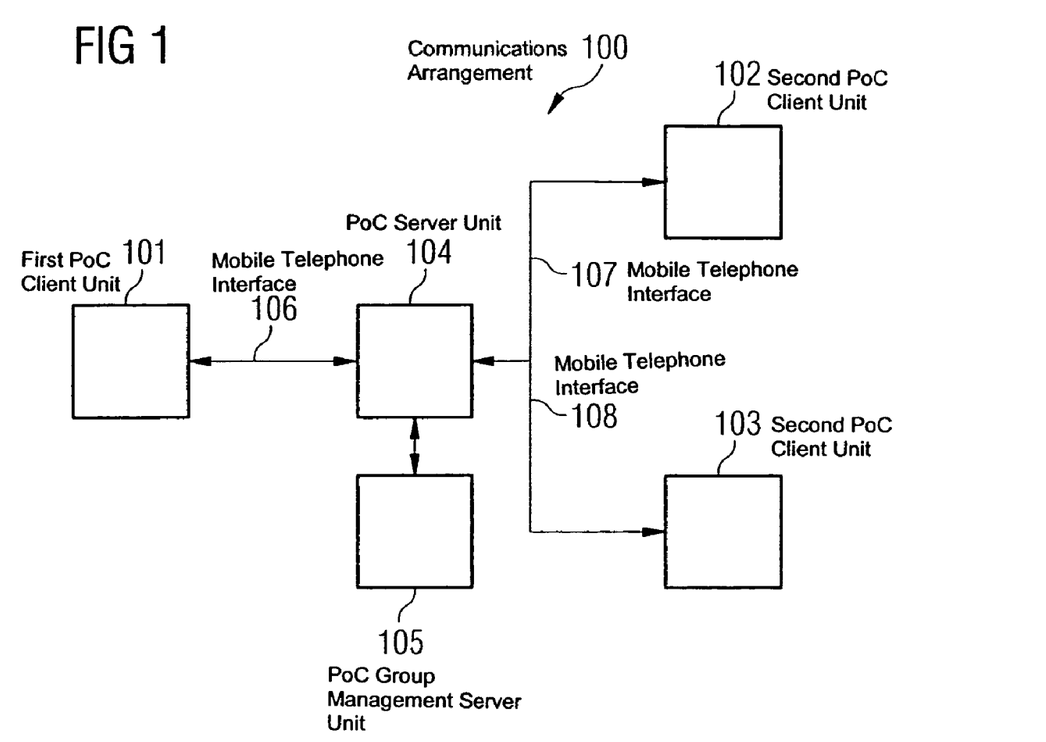
FIG. 1 is an outline of a push-to-talk communications arrangement according to an exemplary embodiment of the invention.

As illustrated in FIG. 1, a push-to-talk over cellular communications arrangement 100 (PoC communications arrangement 100) has a push-to-talk over cellular client unit 101 (first PoC client unit 101), two second push-to-talk over cellular client units (102, 103) (second PoC clients units 102, 103) and a push-to-talk over cellular server unit 104 (PoC server unit 104) and a push-to-talk over cellular group management server unit 105 (PoC group management server unit 105).

The PoC client units 101, 102, 103 are each integrated in a mobile telephone terminal, configured for communication according to the UMTS standard in these exemplary embodiments, alternatively configured for communication according to the GSM standard, GPRS standard or some other mobile telephone communications standard, in particular a 3GPP mobile telephone communications standard.

In these exemplary embodiments of the invention, the PoC server unit 104 is provided in a switching unit, as is the PoC group management server unit 105.

The PoC client units 101, 102, 103, the PoC server unit 104 and the PoC group management server unit 105 are configured in the way described in [1] with the exception of the push-to-talk over cellular connection setup message, and its processing, described below.

Generally, within the scope of the invention, a push-to-talk over cellular communication is understood as a communication between a transmitter and a receiver via a mobile telephone interface in which the transmitter can transfer, for example after the selection of a specific PoC key on the communications terminal, a voice signaling message to at least one receiver, preferably to a plurality of receivers simultaneously, using the duplex method, preferably using the half-duplex method. According to the half-duplex method, only the user of the transmitter unit can speak and the users of the receiver units can only listen to the user of the transmitter unit and not interrupt him.

According to the PoC technology, the voice data which is spoken in is usually already distributed via the IMS core communications network to the receiver or receivers as the speech data is spoken into the mobile telephone terminal which contains a push-to-talk over cellular client unit. This technology is also referred to as streaming. As a result, PoC technology can be understood, from the user's point of view, as being analogous to the classic CB radio, but with the extension that the transmitter can reach receivers throughout the world, which receivers can be reached by means of the communications network, preferably by means of at least one mobile telephone communications network.

According to the PoC service, if the transmitter would like to speak to the same receivers repeatedly it is possible for each PoC receiver to define his personal, permanently predefined communications partner groups. Thus, for example, a user of a PoC-enabled terminal can, for example, specify a group of "friends" with the corresponding group members and their respective addresses, in the form of a telephone number as session initiation protocol-unique resource locator (SIP-URL) or define them in the form of a session initiation protocol address (SIP address as SIP-URL). The group which is defined by the user is generally provided with a separate group address, for example also in the form of a SIP-URL so that, when a PoC communications link to the respective group is set up by a user of a PoC communications unit who is initiating the communications link, all the corresponding group members can be addressed by means of the PoC server unit 104 and are invited to join the PoC communication, i.e. the communications setup request messages are transferred to all the PoC client units contained in the respective group.

A precondition in this case is that the respective PoC client units are signed on in the respective mobile telephone communications network, i.e. are "online", and are registered for the PoC service.

The users of a PoC client unit or of its terminal who are involved in a PoC communication, whether actively or passively, are also referred to below as participants in a PoC communication.

As described in [1], the PoC client units 101, 102, 103 and the PoC server unit 104 and the PoC group management server unit 105 are configured for communication according to the Session Initiation Protocol (SIP), and in the lower communication layers, i.e. in the transport layer for communication according to the Transport Control Protocol (TCP) and/or User Datagram Protocol (UDP) and in the switching layer for communication according to the Internet Protocol (IP).

In other words, the PoC communications arrangement 100 is configured for communication based on the IP multimedia subsystem.

Two alternative embodiments for setting up a PoC communications link are described below.

After a PoC communications link has been set up, useful data, in particular speech data, is transmitted from the first PoC client unit 101 to the second PoC client units 102, 103 specified in the respectively selected group via the IP-based communications network and via the PoC server unit 104, possibly using the PoC group management server unit 105, in accordance with the half-duplex method.

As is illustrated in FIG. 1, the PoC client units 101, 102, 103 are connected to the PoC server unit 104 by means of one mobile telephone interface 106, 107, 108 each, and are connected via said PoC server unit 104 to the PoC group management server unit 105. In this context it is to be noted that the PoC group management server unit 105 can be integrated into the PoC server unit 104.

In the case in which the communications arrangement 100 is based on the UMTS standard, the mobile telephone interfaces 106, 107, 108 can be set up by means of the Radio Access Network (RAN), the Core Network (CN) and the IP multimedia subsystem.

In one alternative embodiment of the invention, basically any desired other suitable network or communications protocol below the switching layer, i.e. below the Internet protocol level, can be used to transmit data, for example the customary telephone network (PSTN).

In the text which follows, for reasons of simpler presentation in each case only the message flow for the case in which the PoC server unit 104 is operated in the unconfirmed indication mode, i.e. early media mode, will be described.

The message flow for the setup of a PoC communications link for the case in which the PoC server unit 104 is operated in the confirmed indication mode is correspondingly configured while in this case it is to be noted that for the PoC client unit which requests the setup of a communications link it is then completely impossible to choose between the unconfirmed indication mode and the confirmed indication mode since the unconfirmed indication mode is not at all offered by the PoC server unit 104.

Figure 5A:
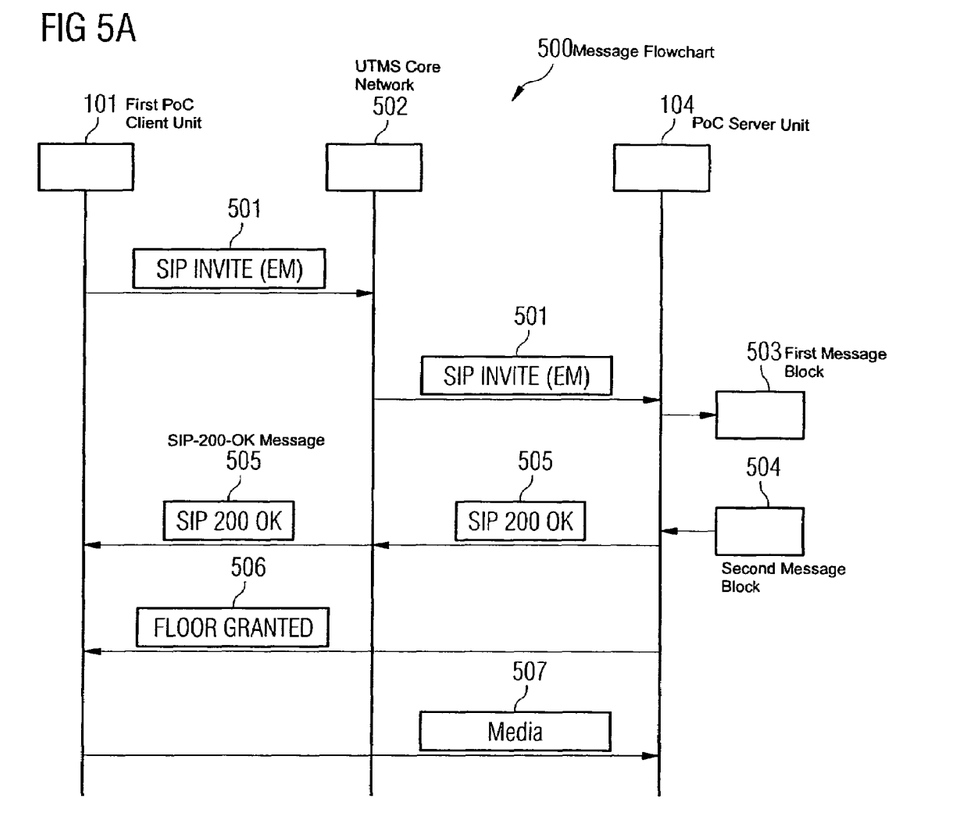
FIGS. 5A and 5B are message flowcharts in which the setup of a push-to-talk communications link according to a first exemplary embodiment of the invention is illustrated.

As is illustrated in FIG. 5A in a first message flowchart 500, at first a SIP-INVITE message 501 is transmitted from the first PoC client unit 101 to the PoC server unit 104 by means of the UMTS core network 502 (UMTS core communications network 502).

FIG. 5A illustrates the case in which the first PoC client unit 101 or its user has selected the unconfirmed indication mode.

In this case, the PoC communications link setup message 501 contains a PoC mode information item in the form of a SIP-INVITE message 501 in a message field which is additionally provided in comparison with the prior art, with the PoC mode information item being assigned the information that the unconfirmed indication mode (EM) has been selected.

In other words, the SIP-INVITE message 501 contains an additional parameter field in which the PoC mode information is contained. In the case shown in FIG. 5A, the information that the unconfirmed indication mode is desired within the scope of the setup of the PoC communications link. The SIP-INVITE message is transmitted from the UMTS core communications network 502 to the PoC server unit 104 which transfers the corresponding requests for the setting up of a PoC communications link to the group members specified in the SIP-INVITE message 501 or SIP addresses and the associated second PoC client units 102, 103 (not shown in FIG. 5A), symbolized in FIG. 5A by a first message block 503.

The formation of a PoC communications link setup confirmation message 505, which is transferred in the form of a SIP-200-OK message 505 by the PoC server unit 104 to the first PoC client unit 101 via the UMTS core communications network 502 is symbolized by means of a second message block 504.

This message is transferred to the first PoC client unit 101 as soon as a communications link can be set up between the first PoC client unit 101 and the PoC server unit 104, and if the condition that at least one of the selected second PoC client units 102, 103 is currently available in the mobile telephone communications network and is signed on to the PoC service, i.e. is online, and the user of the respective second PoC client unit 102, 103 has set the "automatic answering mode" for himself, is fulfilled.

The PoC server unit 104 then transfers a floor granted message 506 to the first PoC client unit 101 in which the first PoC client unit 101 is informed that it is possible to start the transmission of useful data, in particular the transmission of speech data, from the first PoC client unit 101 to the PoC server unit 104.

Speech which is subsequently spoken in by the user of the first PoC client unit 101 is encoded by means of the first PoC client unit 101 and transmitted, in correspondingly encoded speech messages 507, to the PoC server unit 104 in accordance with the half-duplex method, if appropriate buffered at said unit 104 and transmitted on to the selected PoC client units 102, 103 after the actual setup of a PoC communications link has taken place.

Figure 5B:
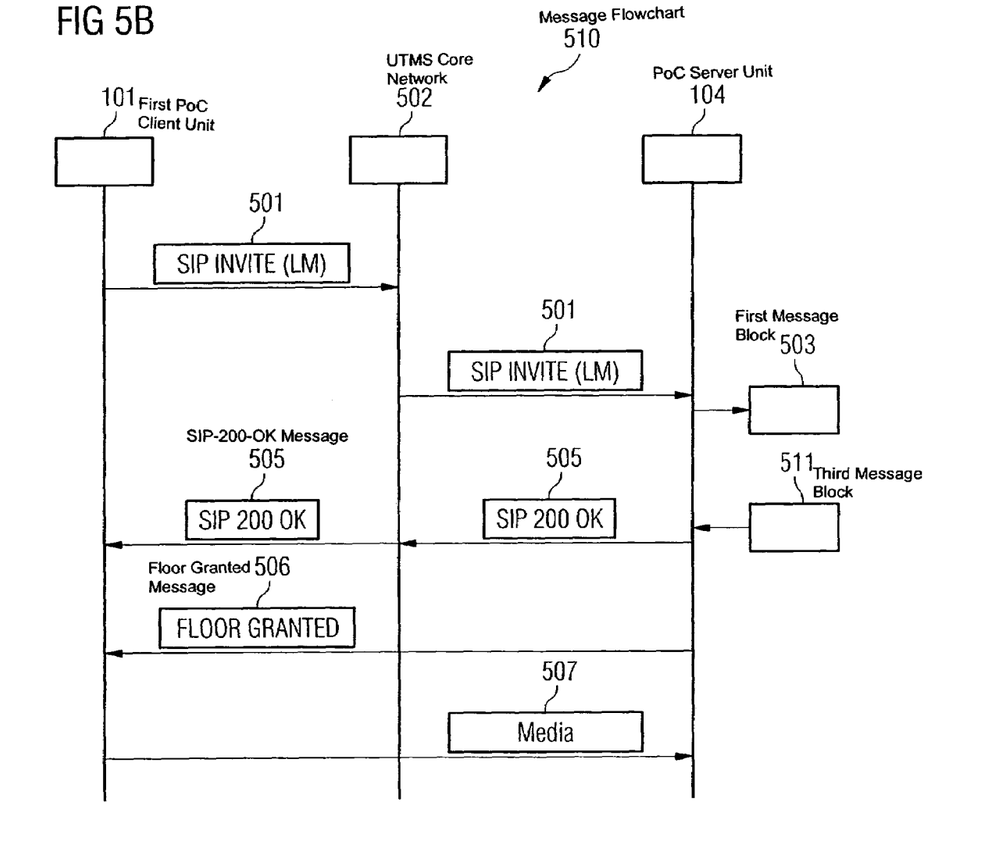

In FIG. 5B, the case in which the confirmed indication mode (LM) is selected by the user of the first PoC client unit 101 in the SIP-INVITE message 501 is illustrated in a second message flowchart 510 according to the first exemplary embodiment.

The message flow corresponds to the message flow described above according to FIG. 5A with the difference that the PoC communications link setup confirmation message 505 is not formed by the PoC server unit 504 and transmitted to the first PoC client unit 101 until at least one of the selected second PoC client units 102, 103 or their user has accepted the respective call (symbolized in FIG. 5B by the message block 503). The acceptance of the calls as a trigger for the formation and transmission of the SIP-200-OK message 505 is illustrated in FIG. 5B by means of a third message block 511.

The further messages and actions correspond to the message flow between FIG. 5A, for which reason in this case a renewed explanation of this procedure will not be given.

The procedure illustrated in FIG. 5B clearly signifies that the user of the first PoC client unit 101 does not receive the enable signal for speaking information to be transmitted to the second PoC client units 102, 103, and therefore the voice signals are not transmitted, until after at least one user of the selected second PoC client units 102, 103 has accepted the call.

Figure 6A:
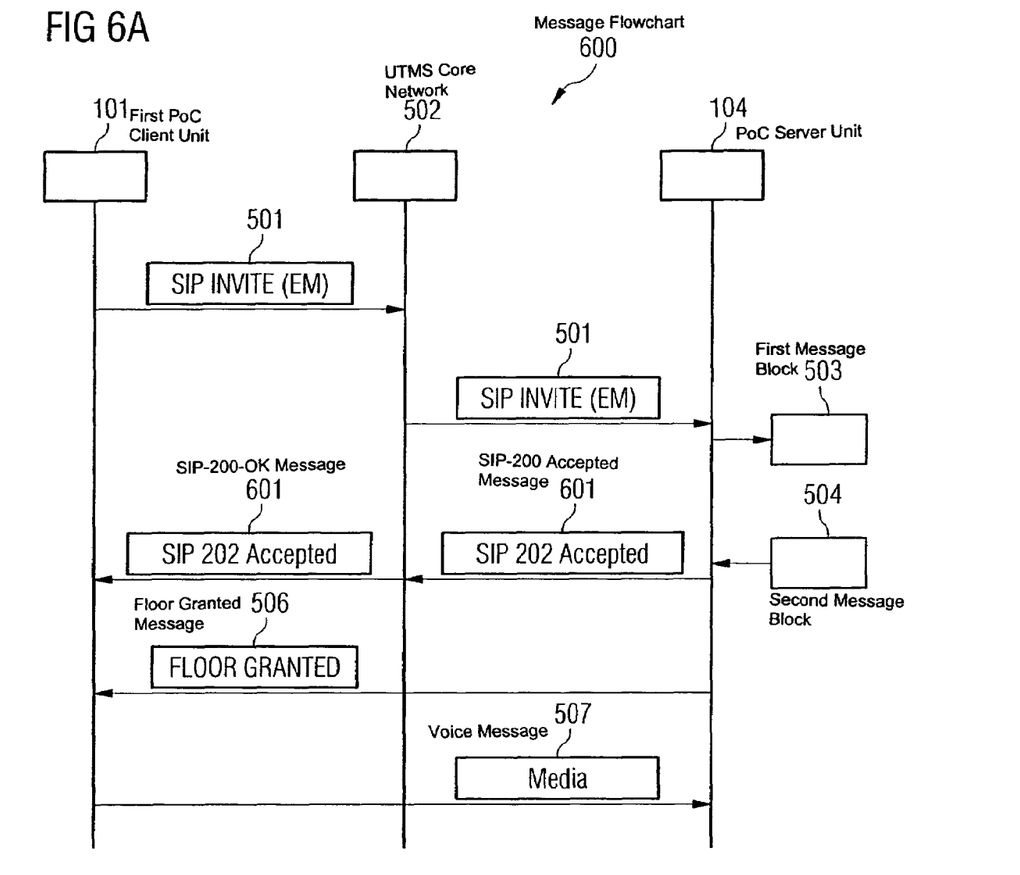
FIG. 6A and 6B are message flowcharts in which the setup of a push-to-talk communications link according to a second exemplary embodiment of the invention is described.

FIG. 6A shows, in a third message flowchart 600, the message flow of the setup of a PoC communications link between the first PoC client unit 101 and the PoC server unit 104 according to a second exemplary embodiment of the invention, also for the case in which the PoC server unit 104 is operated in the unconfirmed indication mode.

The second exemplary embodiment differs from the first exemplary embodiment in the message flow only in that, instead of a SIP-200-OK message 505 as a PoC communications link setup confirmation message, a SIP-202 accepted message 601 is provided, said message being formed by the PoC server unit 104 and transmitted to the first PoC client unit 101.

Since the rest of the message flow is identical to the first exemplary embodiment illustrated in FIG. 5A, the remaining messages and the transmission of the messages will not be described again.

Figure 6B:
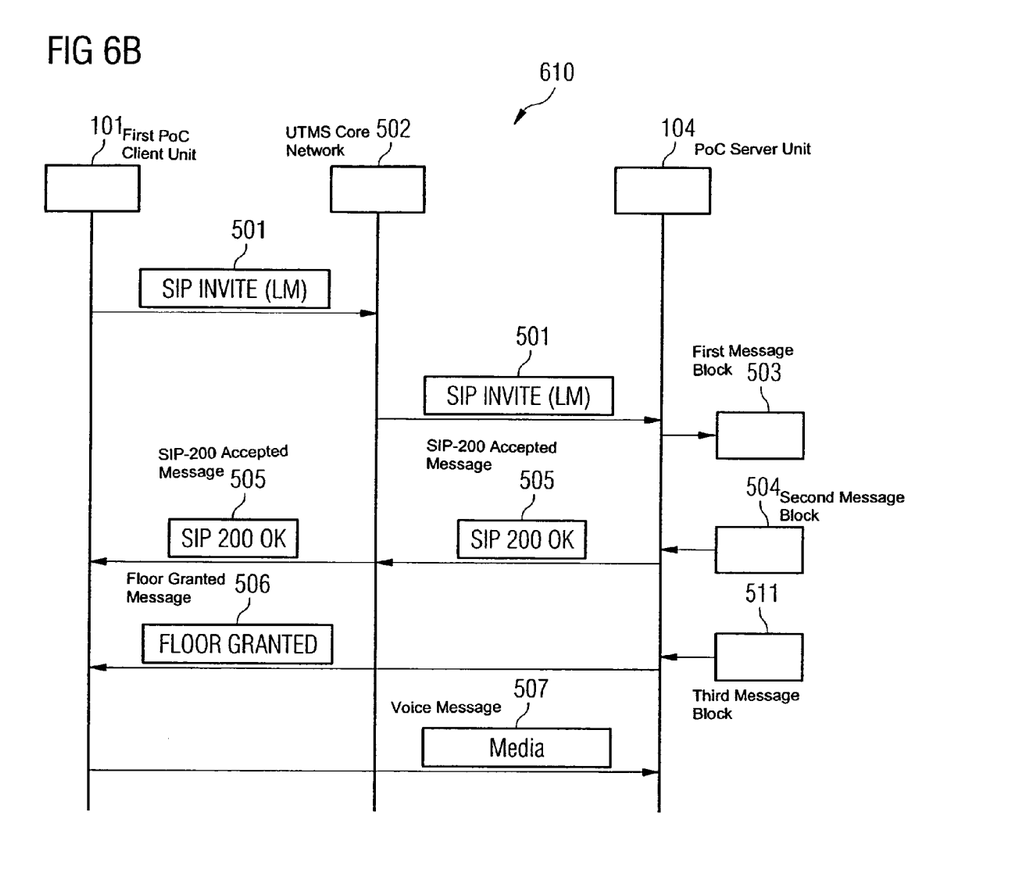

If the user of the first PoC client unit 101 requests the confirmed indication mode according to the second exemplary embodiment of the invention, a SIP-200-OK message 505 is transferred of him, as in the first exemplary embodiment, as soon as the communications link between said unit 101 and the PoC server unit 104 is formed (cf. FIG. 6B).

However, according to this exemplary embodiment of the invention the floor granted message 506 is not transmitted to him until at least one of the selected PoC client units or its user has accepted the call. Only then can the user of the first PoC client unit 101 begin to speak so that the spoken-in data is then transmitted from the first PoC client unit 101 to the PoC server unit 104 and via it to the selected second PoC client units 102, 103.

As a result, in each case the PoC communications link is set up and the exchange of messages, which preferably permits the transmission of speech signals in one direction, i.e. in accordance with the half-duplex method, is carried out until the PoC communications link is terminated.

According to one exemplary embodiment of the invention, the mode information is placed in the SIP-INVITE message using a content type, as follows:

INVITE sip:Projekt-Team@ptt.siemens.com SIP/2.0
Via: SIP/2.0/UDP pc33.siemens.com;
    branch=z9hG4bK776asdhds
To: Projekt-Team<sip:Projekt-Team@ptt:siemens.com>
From: T1<sip:T1@infineon.com>;tag=1928301774
. . .
Content-Type: multipart/mixed
Content-Type: application/sdp
Content-Length: . . .

. . .
Content-Type: application/poc_session_setup_param+xml
Content-Length: . . .
<poc_session_setup_param>
<indication mode="early_media"/>
</poc_session_setup_param>

In one alternative embodiment there is provision for the PoC mode information to be provided in another separate field, for example in a SIP header field or a SDP header field and to be transmitted from the first PoC client unit to the PoC server unit 104.

In a further alternative embodiment of the invention there is provision for the PoC mode information to be transmitted in a useful data field of a SIP message from the first PoC client unit 101 to the PoC server unit and to be acquired there by means of a parser and for the corresponding actions to be provided.

It is therefore intended that the foregoing detailed description be regarded as illustrative rather than limiting, and that it be understood that it is the following claims, including all equivalents, that are intended to define the spirit and scope of this invention. Nor is anything in the foregoing description intended to disavow scope of the invention as claimed or any equivalents thereof.

LIST OF REFERENCE NUMERALS

100 Communications arrangement
101 First PoC client unit
102 Second PoC client unit
103 Second PoC client unit
104 PoC server unit
105 PoC group management server unit
106 Mobile telephone interface
107 Mobile telephone interface
108 Mobile telephone interface
200 Message flowchart
201 First PoC client unit
202 IMS core communications network
203 PoC server unit
204 Communications link setup request
205 First SIP-INVITE message
206 SIP-100 trying message
207 SIP-100 trying message
208 SIP-180 ringing message
209 SIP-200-OK (INVITE) message
210 Communications setup indication
211 SIP-ACK message
212 SIP-NOTIFY message
213 SIP-200-OK message
300 Message flowchart
301 Communications link setup request
302 First SIP-INVITE message
303 SIP-100 trying message
304 SIP-202 accepted message
305 Communications link indication
306 SIP-ACK message
307 SIP-NOTIFY message
308 Indication that communications link has been set up
309 SIP-200-OK (NOTIFY) message
400 Message flowchart
401 SIP-INVITE message
402 SIP-UNCONFIRMED-OK message
403 SIP floor granted message
404 Useful data messages
405 SUBSCRIBE (result) message
406 SIP-NOTIFY (result) message
500 Message flowchart
501 SIP-INVITE message
502 UNTS core communications network
503 First message block
504 Second message block
505 SIP-200-OK message
506 Floor granted message
507 Voice message
510 Message flowchart
511 Third message block
600 Message flowchart
601 SIP-200 accepted message

The invention claimed is:

1. A method for setting up a push-to-talk communications link between a first push-to-talk client unit and at least one second push-to-talk client unit, the method comprising:
   transmitting a push-to-talk connection setup message from the first push-to-talk client unit to a push-to-talk server unit, wherein the push-to-talk connection setup message contains a push-to-talk mode information item with which it is specified, whether the requested push-to-talk communication link should be built in a push-to-talk confirmed mode or a push-to-talk unconfirmed mode, wherein an enable signal is transmitted to the first push-to-talk client unit to enable transmission of useful data depending on a communications link mode from the push-to-talk server unit at different times within the scope of the setup of the push-to-talk communications link; and
   setting up the push-to-talk communications link from the push-to-talk server unit to the at least one second push-to-talk client unit taking into account the push-to-talk mode information in the push-to-talk connection setup message.

2. The method as claimed in claim 1, wherein the useful data comprises at least one of: voice data, image data, or textual data.

3. The method as claimed in claim 1, wherein a mobile telephone communications link is set up as the push-to-talk communications link.

4. The method as claimed in claim 1, wherein an unconfirmed indication mode or a confirmed indication mode can be selected by means of the mode information.

5. The method as claimed in claim 1, wherein in order to set up the push-to-talk communications link, a communications protocol is used which is implemented in at least one of the following layers according to an OSI reference model: a session layer, a presentation layer or an application layer.

6. The method as claimed in claim 5, wherein a session initiation protocol is used to set up the push-to-talk communications link.

7. The method as claimed in claim 6, wherein the push-to-talk link setup message comprises a session initiation protocol INVITE message.

8. The method as claimed in claim 5, wherein the push-to-talk link setup message is transmitted by means of a transport control protocol or by means of a user datagram protocol.

9. The method as claimed in claim 8, in which the user datagram protocol messages are transmitted by means of an Internet protocol.

10. A push-to-talk client unit having:
   a unit for forming a push-to-talk link setup message, wherein the push-to-talk link setup message contains a push-to-talk mode information item with which it is specified, whether the requested push-to-talk communication link should be built in a push-to-talk confirmed mode or a push-to-talk unconfirmed mode, wherein the first push-to-talk client unit receives an enable signal for transmitting useful data as a function of the communications link mode from a push-to-talk server unit at different times within the scope of the setup of the push-to-talk communications link, and
   a transmitter unit for transmitting the push-to-talk link setup message to a push-to-talk server unit.

11. The push-to-talk client unit as claimed in claim 10, wherein the useful data comprises at least one of: voice data, image data, or textual data.

12. The push-to-talk client unit as claimed in claim 10, wherein a mobile telephone communications link is set up as the push-to-talk communications link.

13. The push-to-talk client unit as claimed in claim 10, wherein an unconfirmed indication mode or a confirmed indication mode can be selected by means of the mode information.

14. The push-to-talk client unit as claimed in claim 10, wherein in order to set up the push-to-talk communications link, a communications protocol is used which is implemented in at least one of the following layers according to an OSI reference model: a session layer, a presentation layer or an application layer.

15. The push-to-talk client unit as claimed in claim 14, wherein a session initiation protocol is used to set up the push-to-talk communications link.

16. The push-to-talk client unit as claimed in claim 15, wherein the push-to-talk link setup message comprises a session initiation protocol INVITE message.

17. The push-to-talk client unit as claimed in claim 14, wherein the push-to-talk link setup message is transmitted by means of a transport control protocol or by means of a user datagram protocol.

18. The push-to-talk client unit as claimed in claim 17, in which the user datagram protocol messages are transmitted by means of an Internet protocol.

19. A communications arrangement for setting up a push-to-talk communications link between a first push-to-talk client unit and at least one second push-to-talk client unit, having:
 a first push-to-talk client unit which has:
 a unit for forming a push-to-talk link setup message, wherein the push-to-talk link setup message contains a push-to-talk mode information item with which it is specified, whether the requested push-to-talk communication link should be built in a push-to-talk confirmed mode or a push-to-talk unconfirmed mode, wherein the first push-to-talk client unit receives an enable signal for transmitting useful data as a function of the communications link mode from a push-to-talk server unit at different times within the scope of the setup of the push-to-talk communications link, and
 a transmitter unit for transmitting the push-to-talk link setup message to the push-to-talk server unit;
 wherein the push-to-talk server unit has:
 a receiver unit for receiving the push-to-talk connection setup message, and
 a unit for setting up the push-to-talk communications link to the at least one second push-to-talk client unit according to the push-to-talk mode information in the push-to-talk connection setup message, and
 wherein the at least one second push-to-talk client unit has:
 a receiver unit for receiving the push-to-talk link setup message, and
 a transmitter unit for transmitting push-to-talk messages to the push-to-talk server unit.

20. The communications arrangement as claimed in claim 19, wherein the useful data comprises at least one of: voice data, image data, or textual data.

21. The communications arrangement as claimed in claim 19, wherein a mobile telephone communications link is set up as the push-to-talk communications link.

22. The communications arrangement as claimed in claim 19, wherein an unconfirmed indication mode or a confirmed indication mode can be selected by means of the mode information.

23. The communications arrangement as claimed in claim 19, wherein in order to set up the push-to-talk communications link, a communications protocol is used which is implemented in at least one of the following layers according to an OSI reference model: a session layer, a presentation layer or an application layer.

24. The communications arrangement as claimed in claim 23, wherein a session initiation protocol is used to set up the push-to-talk communications link.

25. The communications arrangement as claimed in claim 24, wherein the push-to-talk link setup message comprises a session initiation protocol INVITE message.

26. The communications arrangement as claimed in claim 23, wherein the push-to-talk link setup message is transmitted by means of a transport control protocol or by means of a user datagram protocol.

27. The communications arrangement as claimed in claim 26, which the user datagram protocol messages are transmitted by means of an Internet protocol.

* * * * *